(12) United States Patent
Ming

(10) Patent No.: US 9,430,703 B2
(45) Date of Patent: Aug. 30, 2016

(54) METHOD FOR SEGMENTING TEXT WORDS IN DOCUMENT IMAGES USING VERTICAL PROJECTIONS OF CENTER ZONES OF CHARACTERS

(71) Applicant: KONICA MINOLTA LABORATORY U.S.A., INC., San Mateo, CA (US)

(72) Inventor: Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/578,066

(22) Filed: Dec. 19, 2014

(65) Prior Publication Data

US 2016/0180163 A1   Jun. 23, 2016

(51) Int. Cl.
 G06K 9/34 (2006.01)
 G06K 9/00 (2006.01)
 G06K 9/46 (2006.01)
 G06K 9/32 (2006.01)

(52) U.S. Cl.
 CPC ....... *G06K 9/00463* (2013.01); *G06K 9/00442* (2013.01); *G06K 9/00456* (2013.01); *G06K 9/325* (2013.01); *G06K 9/4652* (2013.01); *G06K 9/00449* (2013.01); *G06K 9/3283* (2013.01)

(58) Field of Classification Search
 CPC .......................... G06K 9/348; G06K 2209/01
 USPC ................................ 382/164, 171, 173, 177
 See application file for complete search history.

(56) References Cited

U.S. PATENT DOCUMENTS

| | | | | | |
|---|---|---|---|---|---|
| 5,680,478 | A | * | 10/1997 | Wang | G06K 9/00456 382/171 |
| 6,562,077 | B2 | * | 5/2003 | Bobrow | G06F 17/30011 382/306 |
| 8,077,973 | B2 | * | 12/2011 | Dong | G06K 9/00859 382/186 |
| 8,620,083 | B2 | * | 12/2013 | King | G06F 17/30011 345/468 |
| 2010/0135578 | A1 | * | 6/2010 | Nakamura | G06K 9/38 382/190 |
| 2014/0270526 | A1 | | 9/2014 | Wu et al. | |

OTHER PUBLICATIONS

Kim et al., "Word segmentation of printed text lines based on gap clustering and special symbol detection", IEEE, 16th international conference on Pattern Recognition, 2002.

* cited by examiner

*Primary Examiner* — Kanjibhai Patel
(74) *Attorney, Agent, or Firm* — Chen Yoshimura LLP

(57) ABSTRACT

A word segmentation method for segmenting a text line into word segments, which is particularly advantageous for processing italic text but can also be used for regular text. A horizontal center zone of the text line, corresponding to the vertical center parts of the characters, is used to generate a center-zone-only vertical projection profile. The center zone is determined using a horizontal projection profile, by locating the two major peaks of that profile and defining the two major peak positions as the upper and lower boundaries of the center zone. Spacing segments (white gaps) in the vertical projection profile are identified, and classified into two classes, namely character spacing (gap between characters with a word) and word spacing (gap between words). The word spacings are used to segment the text line into word segments.

8 Claims, 4 Drawing Sheets

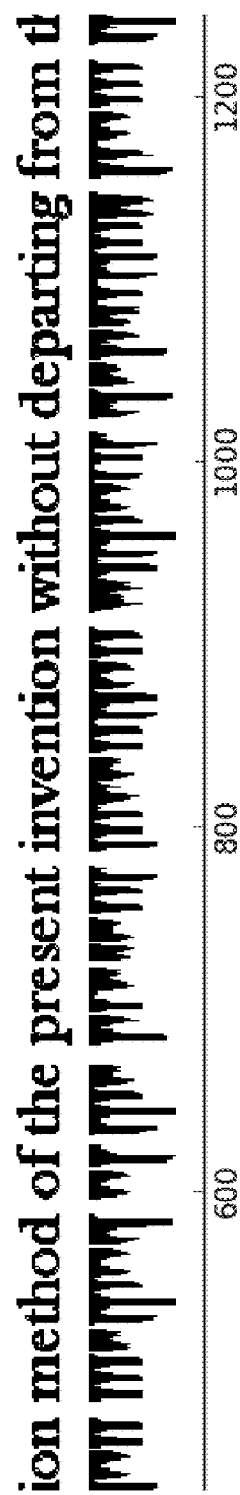
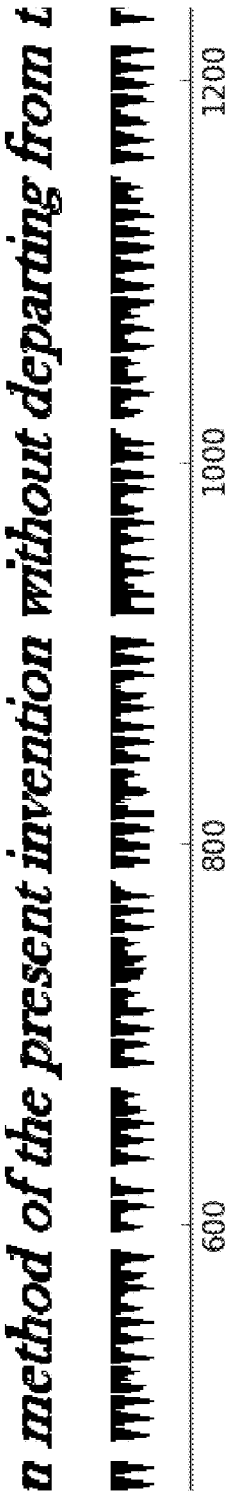

METHOD FOR SEGMENTING TEXT WORDS IN DOCUMENT IMAGES USING VERTICAL PROJECTIONS OF CENTER ZONES OF CHARACTERS

BACKGROUND OF THE INVENTION

1. Field of the Invention

This invention relates to document image processing, and in particular, it relates to word segmentation, i.e. segmenting a document image into sub-images corresponding to words of the document.

2. Description of Related Art

A "document image" refers to a digital image representing a document which includes a substantial amount of text. For example, a document image may be generated by scanning a hard copy document, taking a photograph of a hard copy document, converting a text-based electronic document (e.g. a Word™ document) into an image format (e.g. PDF™), etc. "Document image processing" refers to various processing conducted for document images. One example of document image processing is optical character recognition (OCR), which aims to extract the textual content of the document. Another example of document image processing is document authentication, which aims to determine whether a target document image is the same as an original document image or whether it has been altered.

In some document image processing methods, a document image is segmented at various levels into blocks such as paragraphs of text or photos, text lines segments, words segments, and/or symbol segments. These steps are sometimes referred to as paragraph (or block) segmentation, line segmentation, etc. and collectively referred to as document segmentation. Here, paragraph segment, line segment, etc. refer to sub-images that represent a paragraph, line, etc. of the document. In this disclosure, sometimes a paragraph segment, line segment, etc. is simply called a paragraph, line, etc., but it should be clear from the context of the disclosure that they refer to sub-images rather than the text of the paragraph, line, etc.

Word segmentation refers to segmentation of lines into words. Many word segmentation methods are known. Some of these methods examine spacing segments (white spaces) in a text line to distinguish word spacing (space between neighboring words) and character spacing (space between neighboring characters within words). For example, Soo H. Kim, Chang B. Jeong, Hee K. Kwag, Ching Y. Suen, "Word segmentation of printed text lines based on gap clustering and special symbol detection", 16th international conference on Pattern Recognition (2002) (herein after "Kim et al. 2002"), describes a method which applies a hierarchical clustering method to spacing segments in a text line to distinguish word spacing and character spacing. Commonly owned, co-pending patent application publication US 2014/0270526, published Sep. 18, 2014, describes a word segmentation method that uses a k-means clustering algorithm to classify the space segments as either character spacing or word spacing. Many word segmentation methods use vertical projections of the line text image to determine the locations and sizes of the white spaces before attempting to distinguish word spacing and character spacing.

Connective component based method have been used for word segmentation of italic text lines, but the associated computation cost is relatively high.

SUMMARY

The present invention is directed to an improved method for word segmentation, in particular for processing italic text, which substantially obviates one or more of the problems due to limitations and disadvantages of the related art.

An object of the present invention is to provide a fast and accurate word segmentation method, which is particularly advantageous for italic text but can also be used for text in other fonts.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a word segmentation method for segmenting a horizontal text line image into a plurality of word segments, which includes: (a) generating a horizontal projection profile of the text line image, the horizontal projection profile representing a number of black pixels within the text line image at each vertical position; (b) obtaining two major peak positions of the horizontal projection profile; (c) defining upper and lower boundaries of a center zone of the text line image based on the two major peak positions; (d) generating a vertical projection profile of the center zone, the vertical projection profile representing a number of black pixels within the center zone at each horizontal position; (e) obtaining locations and lengths of a plurality of spacing segments based on the vertical projection profile, each spacing segment being one or more consecutive horizontal positions where the number of black pixels are equal to or less than a threshold value; and (f) segmenting the text line into a plurality of word segments based on the plurality of spacing segments obtained in step (e).

The method may further include generating a bounding box for each word segment obtained in step (f).

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 2(a) shows an exemplary vertical projection profile of a line of text printed in a regular form of a font.

FIG. 2(b) shows an exemplary vertical projection profile of a line of text printed in an italic form of the font.

FIG. 2(c) shows an exemplary center-zone-only vertical projection profile of the same line of text in FIG. 2(b).

DETAILED DESCRIPTION OF PREFERRED EMBODIMENTS

Figure 1:
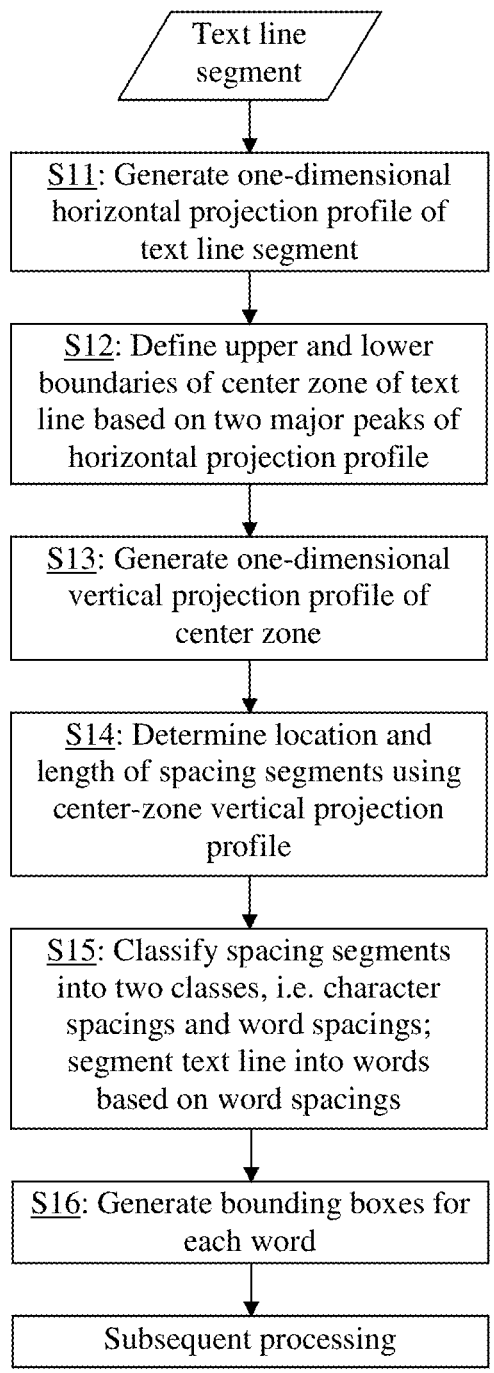
FIG. 1 schematically illustrates a word segmentation method according to an embodiment of the present invention.

Horizontal lines of text are used as examples in the descriptions here, but the word segmentation methods described here, with appropriate modifications, can also be applied to vertical lines of text or any straight lines of text so long as the text has the same characteristics discussed below.

Embodiments of the present invention provide methods for word segmentation, i.e., to segment a line segment of a document image into a plurality of word segments. As mentioned earlier, many existing word segmentation methods use vertical projections of the line text image to determine locations and sizes of spacing segments (white spaces) between characters within a line. More specifically, a one-dimensional vertical projection profile (also referred to as a vertical projection histogram) f(x) of a line segment is generated, where x is the horizontal pixel position and f is the number of black pixels in the line bounding box at each horizontal pixel position.

When spacing segments are calculated based on vertical projection profile, and the resulting spacing segments between words are substantially larger than those between characters within words, the word segmentation methods described in the background section can typically give satisfactory results for separating words. However, these conditions are sometimes not satisfied, especially for italic text. In an italic text line, characters in adjacent words may overlap vertically, causing the white gaps between such words in the vertical projection profile to become very narrow or even disappear. As a result, multiple words may be erroneously classified as one word. Similar problems may occur in cases where the text line has mixed regular and italic fonts.

FIG. 2(a) shows a vertical projection profile of a line of text printed in a regular form of a font (e.g., Times New Roman), and FIG. 2(b) shows a vertical projection profile of a line of the same text printed in an italic form of the same font. As can be seen in a comparison of FIG. 2(b) and FIG. 2(a), for italic text, many white gaps between characters within words (character spacing) disappear, and white gaps between words (word spacing) between some words (e.g. the gaps between "departing" and "from" and between "present" and "invention") become much smaller than other word spacings. The word spacing can even disappear, such as between "of" and "the" in this example. These phenomena are mainly caused by parts of neighboring characters (either within a word or between words) overlapping in the vertical direction. They often present difficulties in segmenting italic text when using word segmentation methods that are based on white gaps, regardless of the algorithms used to distinguish word spacing and character spacing—whether it uses simple thresholding or advanced cluster classification. For example, in the example of FIG. 2(b), the words "of" and "the" will likely be erroneously determined to be one word.

Embodiments of the present invention provide a method that is well adapted for word segmentation of italic text. To solve the above described problems with italic text, the word segmentation method according to embodiments of the present invention takes only the center zone of the text characters to generate vertical projection profiles.

Lower case characters in many western languages can be divided into three zones stacked vertically, namely, top zone, center or main zone, and bottom zone. For example in English, all lower case characters occupy the center zone; some occupy only the center zone, such as "a" and "c;" some also occupy the top zone, such as "b" and "d;" some also occupy the bottom zone, such as "p" and "q;" and some occupy all three zones, such as 'f' in certain fonts. The vertical overlapping of parts of neighboring characters in italic text (within or between words) discussed above, which causes narrowing or disappearance of white gaps between characters in the vertical projection profile, is mainly caused by parts of the characters located in the top zone or bottom zone. Thus, using only the center zone to calculate vertical projection profile can significantly reduce or prevent vertical overlapping.

FIG. 2(c) shows a center-zone-only vertical projection profile of the same line of text (in italic) as in FIG. 2(b). This profile is generated using the method described later. As seen in FIG. 2(c), some word spacings that disappeared in FIG. 2(b) (e.g. the spacing between "of" and "the") are now clearly present and is much larger than typical character spacings, so these two words are much less likely to be erroneously determined to be one word. Also, some character spacings that disappeared in FIG. 2(b) are now present.

Figure 3:
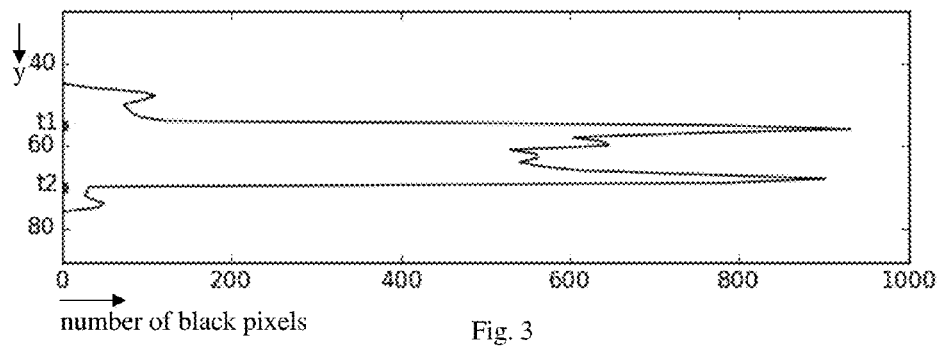
FIG. 3 shows an exemplary horizontal projection profile of a line of text.

The location of the center zone for a line of text may be determined using a one-dimensional horizontal projection profile of the text line. FIG. 3 shows an exemplary horizontal projection profile g(y) of a line of text, where the vertical axis y is the vertical pixel position and the horizontal axis is the number of black pixels in the line bounding box at each vertical pixel position. As seen in this figure, the horizontal projection profile g(y) has two relatively sharp peaks, which correspond to the upper and lower boundaries (horizontal lines) of the center zone of the line. These are due to the fact that at the top and bottom boundaries of the center zone, character strokes often extend in a near-horizontal direction. Thus, the horizontal projection profile can be used to determine the upper and lower boundaries of the center zone.

FIG. 1 schematically illustrates a word segmentation method according to an embodiment of the present invention. The starting point of the method is a text line segment that has been generated from a binary document image. The line segment is a rectangular shaped image having a number of pixels in the horizontal direction and a number of pixels in the vertical direction. The rectangular shape is referred to as the line bounding box. Each pixel has a binary value representing black or white. It is assumed that the image has been de-skewed so that the text lines are horizontal. It is also assumed that the line segmentation technique used to obtain the line segments generates a line bounding box that bounds the text in the line, without extra spaces at the beginning or end of the line. Techniques for achieving these results are well known and not described here.

First, a one-dimensional horizontal projection profile g(y) of the line segment is generated (step S11). The vertical positions of the two major peaks of the horizontal projection profile are then determined, and are used to define the upper and lower boundary positions of the center zone (step S12). The upper and lower boundary positions may be at the y positions of the two major peaks, respectively; or at y positions a few pixels above or below the two major peaks. For example, in some fonts, some characters have short horizontal dashes near the top and/or bottom of the center zone, such as "w," "m," etc. Thus, the upper boundary of the center zone may be chosen to be 2 pixels below the upper peak and the lower boundary may be chosen to be 2 pixels above the lower peak; this way, the center zone will not include these short horizontal dashes so that they do not influence the vertical projection profile. The center zone of the text line is defined as the area of the line bounding box located between the upper and lower boundary positions.

Then, a one-dimensional vertical projection profile $fc(x)$ of the center zone is generated, where x is the horizontal pixel position and fc is the number of black pixels within the center zone at each horizontal pixel position (step S13). The spacing segments (white gaps) in the vertical projection profile $fc(x)$ of the center zone are identified and their lengths are determined (step S14). Each white gap is formed by one or more consecutive pixel positions x for which the vertical projection profile value fc is smaller than or equal to a predetermined threshold value, such as zero.

Figure 4:
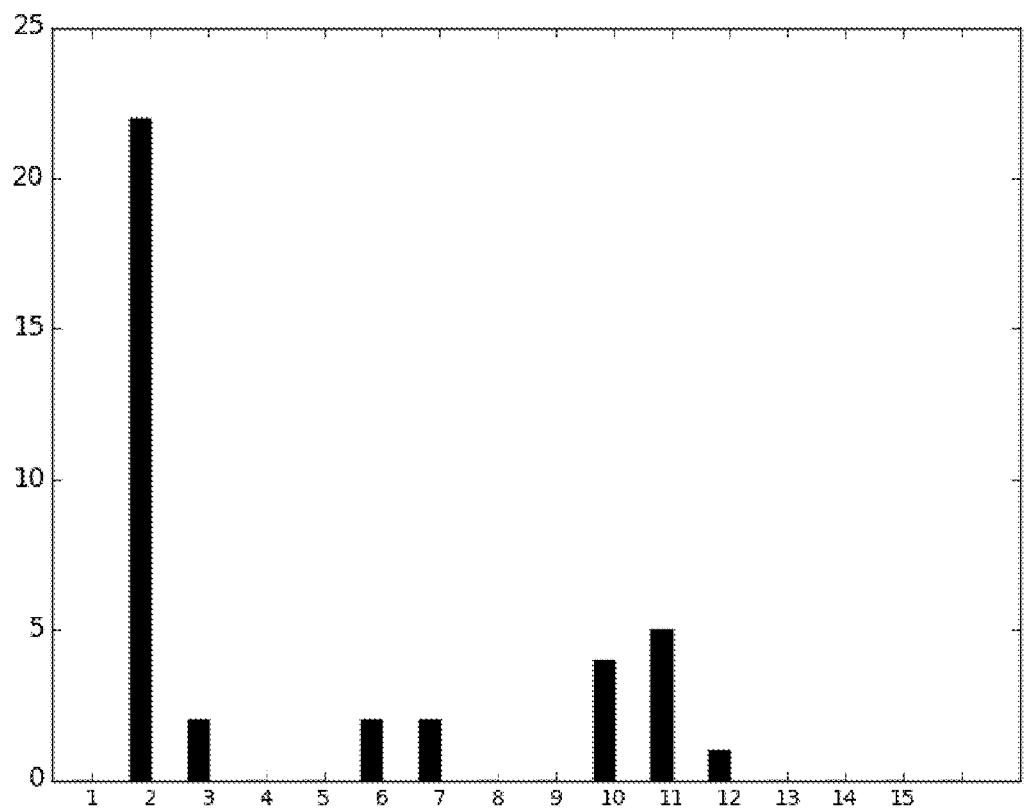
FIG. 4 schematically illustrates an exemplary spacing segment distribution of a line.

The distribution of the lengths of the spacing segment for a typical text line, which has more than one word, tends to have two main peaks, sometimes referred to as a bimodal distribution. This is due to the fact that character spacing lengths and word spacing lengths tend to be significantly different from each other in typical text. This effect can be seen in a spacing distribution histogram, an example of which is schematically illustrated in FIG. 4 (calculated from the exemplary line of text used in FIG. 2(c)). In the spacing distribution histogram, the horizontal axis (bins) represents the lengths of the spacing segments and the vertical axis represents the number or count of spacing segments having a particular length. As demonstrated in this figure, the bimodal distribution is often not ideal, especially for printed and scanned documents; but techniques can be used to properly determine which spacings are character spacings and which ones are word spacings. For example, Otsu's method or clustering classification method can be used to classify the spacings into two classes. In one implementation, application of a classification method to the example shown in FIG. 4 classifies the spacings at 6 and above as word spacing.

Thus, in step S15, the spacing segments identified in step S14 are classified into two classes corresponding to character spacings and word spacings based on their lengths. As a result, the line is segmented into words, where the text between two adjacent word spacings are individual words. In step S16, word bounding boxes may be generated for each word, which may be used to generate word images or used for other subsequent processing of the text.

Various algorithms may be used to classify the spacing segments into two classes in step S15. In one implementation, a predetermined length threshold is used, and spacing segments longer than or equal to the length threshold are deemed word spacings and those shorter than the length threshold are deemed character spacings. In another implementation, a clustering method can be used to perform the classification, such as described in the above-mentioned Kim et al. 2002 article and patent application publication US 2014/0270526.

Regardless of the algorithm used, care should be taken to property handle very short lines such as lines containing a single word or two words, due to the lack of a sufficient number of word spacing segments present in such a line. For example, if the spacing segments for a line, as identified in step S14, have very uniform sizes, e.g., the maximum spacing length is less than two times of the minimum spacing length, and the length of a text line is shorter than a predetermined length, it will be deemed a single word line, and no word segmentation is performed.

The word segmentation method described above can achieve satisfactory segmentation results for italic text; the method is also fast with very low computation cost. The method can also be used to segment lines of regular (non-italic) text, although its advantage over the conventional vertical projection profile will not be as significant.

Note that text lines written in all-capitalized characters (either italic or regular) typically do not have the above-described overlapping problem, as all characters have the same height. For such text, the word segmentation method described here will produce approximately the same result as the conventional methods.

The center-zone-only vertical projection profiles described above may also be used for other purposes in addition to word segmentation. In one application, it is used to determine whether a line of text is written in italic or non-italic form. This may be done by comparing a first vertical projection profile generated using the entire text line bounding box as in conventional methods, and a second vertical projection profile generated using only the center zone according to steps S11-S14 described above. For most regular fonts, the word spacing segments calculated from the two projection profiles will have similar sizes, while for italic text, the word spacing segments calculated from the first projection profile (all zones) will be narrow than those calculated from the second projection profile (center zone only).

Figure 5:
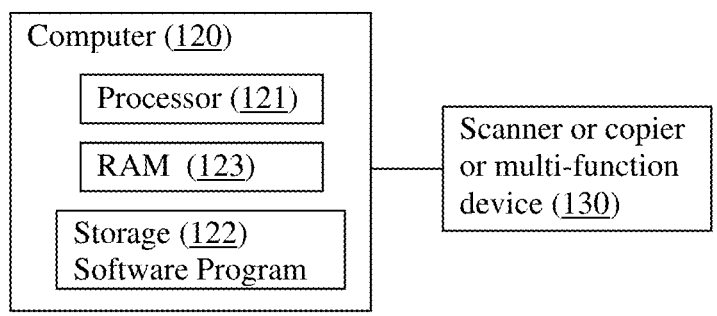
FIG. 5 schematically illustrates a data processing apparatus in which embodiments of the present invention may be implemented.

The word segmentation methods described here can be implemented in a data processing apparatus such as a computer 120 shown in FIG. 5. The computer 120 includes a processor 121, a storage device (e.g. hard disk drive) 122, and an internal memory (e.g. RAM) 123. The storage device 122 stores software programs, which are read out to the RAM 123 and executed by the processor 121 to carry out the methods described here. The computer 120 may be connected to a scanner, copier or multi-function device 130 which has a scanning section that can be used to scan a printed document to be processed by the computer 120. Alternatively, the processor 121, storage device 122 and RAM 123 may be located within the scanner/copier/multi-function device 130, in which case the scanner/copier/multi-function device can directly output processed document such as OCR'ed text. The term data processing apparatus may refer to either the computer 120 or the scanner/copier/multi-function device 130.

In one aspect, the invention is embodied in a data processing apparatus. In another aspect, the invention is computer program product embodied in computer usable non-transitory medium (e.g. storage 122) having a computer readable program code embedded therein for controlling a data processing apparatus. In another aspect, the invention is a method carried out by a data processing system.

It will be apparent to those skilled in the art that various modification and variations can be made in the word segmentation method of the present invention without departing from the spirit or scope of the invention. Thus, it is intended that the present invention cover modifications and variations that come within the scope of the appended claims and their equivalents.

What is claimed is:

1. A word segmentation method performed by a computer for segmenting a horizontal text line image into a plurality of word segments, comprising:
   (a) generating a horizontal projection profile of the text line image, the horizontal projection profile representing a number of black pixels within the text line image at each vertical position;
   (b) obtaining two major peak positions of the horizontal projection profile;

(c) defining upper and lower boundaries of a center zone of the text line image based on the two major peak positions;

(d) generating a vertical projection profile of the center zone, the vertical projection profile representing a number of black pixels within the center zone at each horizontal position;

(e) obtaining locations and lengths of a plurality of spacing segments based on the vertical projection profile, each spacing segment being one or more consecutive horizontal positions where the number of black pixels are equal to or less than a threshold value; and (f) segmenting the text line into a plurality of word segments based on the plurality of spacing segments obtained in step (e) to generate sub-images containing the words.

2. The method of claim 1, further comprising generating a bounding box for each word segment obtained in step (f).

3. The method of claim 1, wherein step (e) includes classifying the plurality of spacing segments into two classes based on their lengths, including a class of character spacings and a class of word spacings, and wherein step (f) includes segmenting the text line using the word spacings.

4. The method of claim 3, wherein step (e) includes classifying a spacing segment into the class of word spacings if its length is longer than or equal to a predetermined length threshold, and classifying a spacing segment into the class of character spacings if its length is shorter than the predetermined length threshold.

5. A computer program product comprising a computer usable non-transitory medium having a computer readable program code embedded therein for controlling a data processing apparatus, the computer readable program code configured to cause the data processing apparatus to execute a word segmentation process for segmenting a horizontal text line image into a plurality of word segments, the process comprising:

(a) generating a horizontal projection profile of the text line image, the horizontal projection profile representing a number of black pixels within the text line image at each vertical position;

(b) obtaining two major peak positions of the horizontal projection profile;

(c) defining upper and lower boundaries of a center zone of the text line image based on the two major peak positions;

(d) generating a vertical projection profile of the center zone, the vertical projection profile representing a number of black pixels within the center zone at each horizontal position;

(e) obtaining locations and lengths of a plurality of spacing segments based on the vertical projection profile, each spacing segment being one or more consecutive horizontal positions where the number of black pixels are equal to or less than a threshold value; and (f) segmenting the text line into a plurality of word segments based on the plurality of spacing segments obtained in step (e) to generate sub-images containing the words.

6. The computer program product of claim 5, wherein the process further comprises generating a bounding box for each word segment obtained in step (f).

7. The computer program product of claim 5, wherein step (e) includes classifying the plurality of spacing segments into two classes based on their lengths, including a class of character spacings and a class of word spacings, and wherein step (f) includes segmenting the text line using the word spacings.

8. The computer program product of claim 7, wherein step (e) includes classifying a spacing segment into the class of word spacings if its length is longer than or equal to a predetermined length threshold, and classifying a spacing segment into the class of character spacings if its length is shorter than the predetermined length threshold.

* * * * *